United States Patent [19]

Impallomeni et al.

[11] 4,330,861
[45] May 18, 1982

[54] DIGITAL EQUALIZER FOR SIGNAL RECEIVER IN QPSK DATA-TRANSMISSION SYSTEM

[75] Inventors: Enrico Impallomeni; Roberto Montagna, both of Turin, Italy

[73] Assignee: CSELT - Centro Studi e Laboratori Telecomunicazioni S.p.A., Torino, Italy

[21] Appl. No.: 204,535

[22] Filed: Nov. 6, 1980

[30] Foreign Application Priority Data

Nov. 8, 1979 [IT] Italy ................ 69173 A/79

[51] Int. Cl.³ ............... H04B 3/14; H03H 7/30; H04L 25/03
[52] U.S. Cl. ....................... 375/15; 375/86; 333/18
[58] Field of Search .............. 375/12, 14, 15, 86; 333/18; 364/724, 825

[56] References Cited

U.S. PATENT DOCUMENTS

| | | | |
|---|---|---|---|
| 3,787,762 | 1/1974 | Sato .................. | 375/15 |
| 3,878,468 | 4/1975 | Falconer ............. | 375/15 |
| 3,935,535 | 1/1976 | Motley et al. ....... | 375/15 |
| 4,029,903 | 6/1977 | Tamburelli .......... | 375/86 |
| 4,061,978 | 12/1977 | Motley et al. ....... | 375/15 |
| 4,076,956 | 2/1978 | Dogliotti et al. ... | 375/86 |

*Primary Examiner*—Jin F. Ng
*Attorney, Agent, or Firm*—Karl F. Ross

[57] ABSTRACT

A signal receiver of a QPSK data-transmission system comprises two noncoherent demodulators feeding digitized in-phase and quadrature components to a pair of transversal filters whose coefficients are read out, during successive keying intervals, from a read/write memory accessed by an arithmetic unit which generates corrective terms updating these coefficients. A comparator in the output of each filter detects estimated phase jumps between delayed and undelayed filtered samples of each signal component and delivers them to a decision circuit as well as to an error detector which also receives quantized output signals from the decision circuit to produce two error signals fed to the arithmetic unit; the latter further receives the delayed and undelayed filtered samples as well as ancillary data temporarily stored in these filters to calculate the corrective terms.

4 Claims, 2 Drawing Figures

4,330,861

DIGITAL EQUALIZER FOR SIGNAL RECEIVER IN QPSK DATA-TRANSMISSION SYSTEM

FIELD OF THE INVENTION

Our present invention relates to a digital equalizer designed to minimize the distortion of incoming signals in a data-transmission system using quadrature phase-shift keying (QPSK).

BACKGROUND OF THE INVENTION

At a transmitting station in such a QPSK system, a number $n = 2^P$ of signal levels are translated into relative phase shifts of two carrier waves of like frequency, nominally in quadrature with each other, whereupon these carriers are combined into an outgoing wave. With $p = 3$, for example, each carrier may be selectively subjected to four different phase delays to establish eight distinct signal levels or symbols. With coherent demodulation, i.e. when the carrier frequency is made available at a receiving station (as by a separately transmitted pilot tone), the two carriers can be readily separated as described, for example, in commonly owned U.S. Pat. Nos. 4,029,903 and 4,076,956. Distortions experienced during transmission are eliminated with the aid of a decision circuit which quantizes the detected phase difference between the two carriers to reconstitute the signal levels represented thereby.

When transmission of the carrier frequency to a receiving station is impractical, the incoming signal at that station must be split into in-phase and quadrature components by non-coherent demodulation, e.g. as described in U.S. Pat. No. 3,935,535; to compensate for intersymbol interference, these components are digitized and fed to a phase comparator by way of a preferably adaptive equalizer advantageously comprising transversal filters. The filtering coefficients, however, must be continuously updated to minimize unavoidable decision errors.

OBJECT OF THE INVENTION

Thus, the object of our present invention is to provide improved means for solving the updating problem in such an equalizer.

SUMMARY OF THE INVENTION

We realize this object, in accordance with our invention, by the provision of a digital comparison network detecting estimated phase jumps between currently filtered signal samples and immediately preceding filtered samples, delayed by one symbol period or keying interval, for each noncoherently demodulated component. The estimated phase jumps, which give rise to quantized output signals emitted by a decision circuit, are fed together with these output signals to an error detector deriving therefrom two error signals $e_1$, $e_2$ which are further combined in an arithmetic unit with the delayed and undelayed filtered samples and with ancillary data stored in various register stages of the filters for the in-phase and quadrature components to produce corrective terms $m_1$, $m_2$ jointly serving to update corresponding filtering coefficients read out during each keying interval from an associated memory.

These filtering coefficients will be generically designated $C_k^j$ where k represents one of the several taps of the corresponding filter and j denotes one of the several iteration steps of the recursive filtering process. The updating is carried out according to the formula $$C_k^j = C_k^{j-1} + \alpha \nabla_k^j \quad (1)$$

where $\alpha$ is a predetermined constant (usually a fraction), selected according to the desired convergence rate, stability and calculation precision, and $\nabla_k^j$ is the gradient of the squared decision error relating to the $j^{th}$ iteration and the $k^{th}$ coefficient. These iterations recur at the symbol frequency extracted from the incoming signal. Each gradient $\Delta$ is generated by the arithmetic unit as the sum of the corrective terms $m_1$ and $m_2$ relating to the corresponding filtering coefficient.

BRIEF DESCRIPTION OF THE DRAWING

The above and other features of our invention will now be described in detail with reference to the accompanying drawing in which.

SPECIFIC DESCRIPTION

Figure 1:
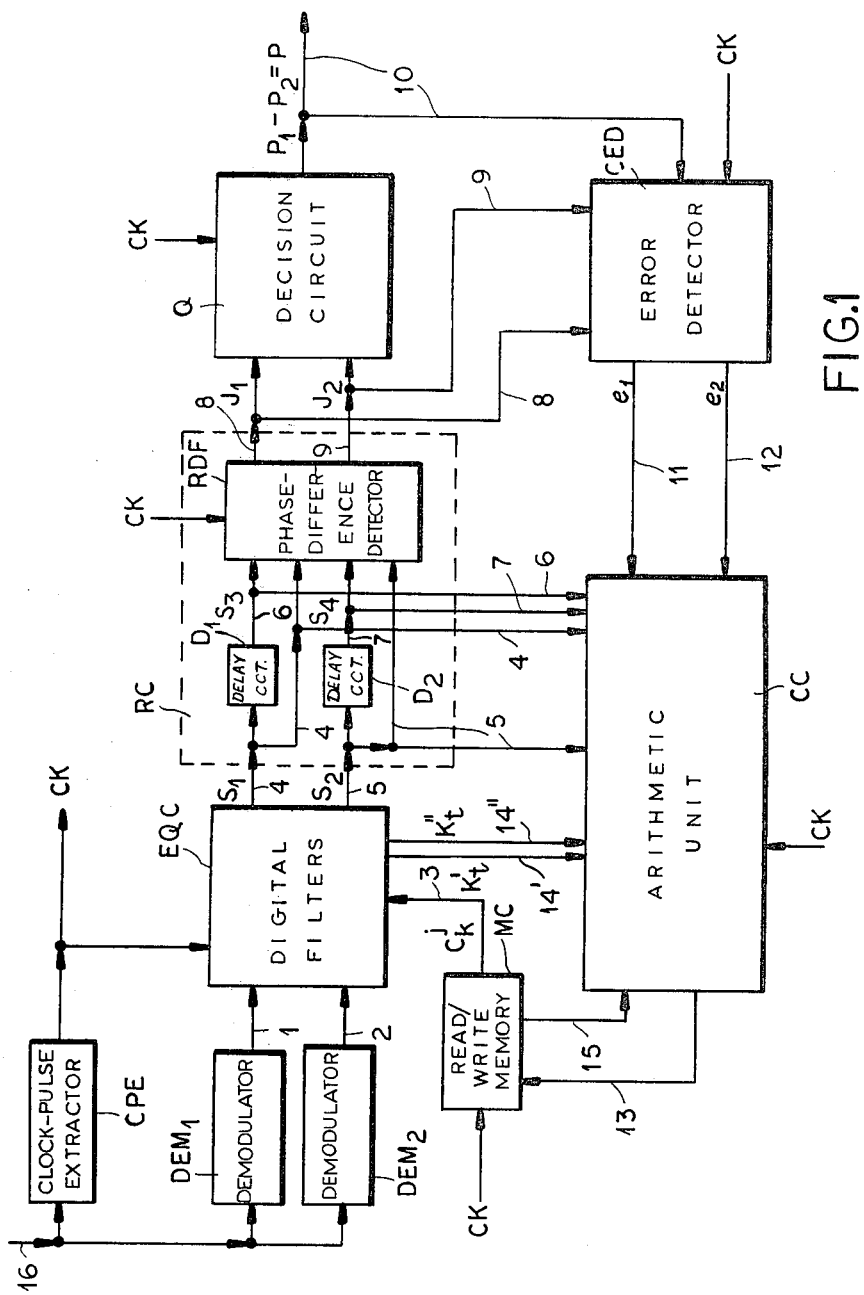
FIG. 1 is a block diagram of an equalizer in accordance with our invention, including an arithmetic unit for updating stored filtering coefficients.

As illustrated in FIG. 1, an equalizer according to our present invention comprises a clock-pulse extractor CPE and a pair of noncoherent demodulators $DEM_1$, $DEM_2$ connected to the receiving end of a transmission path or channel 16 in a PSK (phase-shift keying) data-transmission system employing differential quadrature modulation as discussed above. These demodulators feed digitized in-phase and quadrature samples via leads 1 and 2, respectively, to a recursive filtering circuit EQC whose non-illustrated constituents include buffer registers, with stages temporarily storing ancillary data, and at least two transversal filters each provided with a number of taps, e.g. as described in the aforementioned U.S. Pat. No. 3,935,535. The operation of the filters is controlled by varying the values of multiplicative filter coefficients $C_k^j$, as described in detail hereinafter, the coefficients being fed to circuit EQC via a line 3 from a random-access or read/write memory MC having as many cells as there are coefficients. The ancillary data respectively associated with the several taps are in-phase and quadrature samples $K'_t$ and $K''_t$ appearing at a time t on respective output lines 14' and 14''.

Circuit EQC emits filtered in-phase and quadrature digital signals $S_1$, $S_2$ on a pair of leads 4, 5 extending to respective delay circuits $D_1$, $D_2$ and a phase-difference detector RDF forming part of a comparison network RC. Delay circuits $D_1$, $D_2$ retard incoming pulses by a time equal to the symbol period or keying interval of the modulated wave coming over transmission channel 16.

Phase-difference detector RDF comprises two comparators respectively connected across circuits $D_1$ and $D_2$ to compare undelayed samples $S_1$, $S_2$ on leads 4,5 with delayed samples $S_3$, $S_4$ on output leads 6,7 of these circuits, thereby discovering phase differences between the signals sampled in a current and an immediately preceding keying interval on both the in-phase and the quadrature branch. Detector RDF thus generates estimates of in-phase and quadrature phase shifts and encodes them in a pair of phase-jump signals $J_1$, $J_2$ transmitted via leads 8, 9 to a decision circuit Q and to an error detector CED.

Decision circuit Q incorporates a conventional threshold device and a decoder (not shown) generating two quantized output signals $P_1$ and $P_2$ which are then differentially combined into an m-bit word P for each symbol encoded in the phase-jump signals $J_1$, $J_2$ of the in-phase and quadrature branches. Signals $P_1$ and $P_2$ appear on an output connection 10 of circuit Q and are differentially combined with phase-jump signals $J_1$, $J_2$, respectively, by an error detector CED connected across this circuit. Detector CED emits in-phase and quadrature error signals $e_1 = P_1 - J_1$ and $e_2 = P_2 - J_2$ transmitted via respective leads 11, 12 to an arithmetic unit CC which calculates updated filtering coefficients $C_k^j$ according to the foregoing equation (1) where k and j are integers as defined above.

Arithmetic unit CC also has inputs connected to leads 4, 5, 6, 7, 14', 14" and accesses the memory MC via an output connection 13 and an input connection 15. Under the control of timing pulses CK from sync extractor CPE, and in accordance with signals arriving over input connections 4–7, 11, 12, 14', 14" and 15, unit CC calculates a new set of filter coefficients $C_k^j$ during each keying interval and transmits these updated coefficients to memory MC via connection 13. Clock pulses CK are also supplied by extractor CPE to digital filter EQC, phase-difference detector RDF, decision unit Q, error detector CED and read/write memory MC. The equalizer shown in FIG. 1 is controlled by these clock pulses to have an operating cycle with a duration equal to the symbol period.

Figure 2:
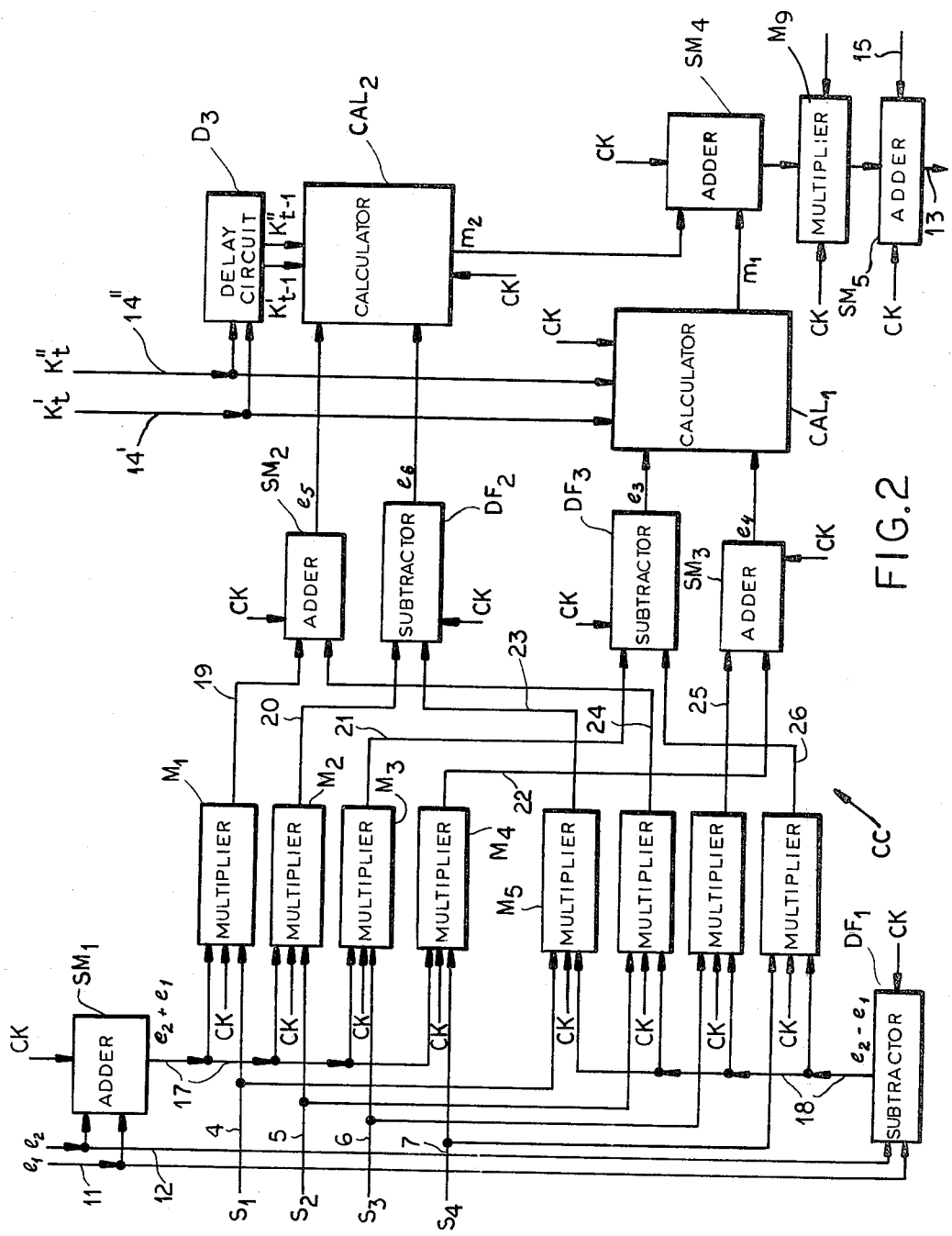
FIG. 2 is a more detailed block diagram of the arithmetic unit shown in FIG. 1.

As illustrated in FIG. 2, arithmetic unit CC comprises an adder $SM_1$ and a subtractor $DF_1$ having dual inputs tied to leads 11 and 12 and outputs connected via respective leads 17 and 18 to associated sets of multipliers $M_1$–$M_4$ and $M_5$–$M_8$. Other inputs of the four multipliers of each set are connected to leads 4–7, respectively, for receiving the in-phase and quadrature signals $S_1$, $S_2$, $S_3$ and $S_4$.

Under the control of clock pulses CK, adder $SM_1$ algebraically combines digitally encoded error signals $e_1$ and $e_2$ on leads 11 and 12 to form a sum $e_1 + e_2$ subsequently transmitted via lead 17 to multipliers $M_1$–$M_4$. These multipliers calculate respective cross-products $S_1 \cdot (e_1+e_2)$, $S_2 \cdot (e_1+e_2)$, $S_3 \cdot (e_1+e_2)$, $S_4 \cdot (e_1+e_2)$ which are then carried by their output leads 19–22 to an adder $SM_2$, a subtractor $DF_2$, another subtractor $DF_3$ and another adder $SM_2$, respectively.

Multipliers $M_5$–$M_8$ form, under the control of clock pulses CK, respective cross-products $S_1 \cdot (e_2-e_1)$, $S_2 \cdot (e_2-e_1)$, $S_3 \cdot (e_2-e_1)$, $S_4 \cdot (e_2-e_1)$ from signals $S_1$–$S_4$ and a difference $e_2-e_1$ computed by subtractor $DF_1$ from error signals $e_1$ and $e_2$. These cross-products are fed over respective output leads 23–26 to subtractor $DF_2$, adder $SM_2$, adder $SM_3$ and subtractor $DF_3$. Calculating stages also controlled by clock pulses CK, $DF_3$, $SM_3$, $SM_2$ and $DF_2$ emit intermediate error signals $e_3$–$e_6$ which conform to the algebraic relationships:

$$e_3 = (e_1+e_2) \cdot S_3 - (e_2-e_1) \cdot S_4 \quad (2)$$

$$e_4 = (e_1+e_2) \cdot S_4 - (e_2-e_1) \cdot S_3 \quad (3)$$

$$e_5 = (e_1+e_2) \cdot S_1 - (e_2-e_1) \cdot S_2 \quad (4)$$

$$e_6 = (e_1+e_2) \cdot S_2 - (e_2-e_1) \cdot S_1 \quad (5)$$

Error signals $e_3$, $e_4$ are transmitted to a first calculator $CAL_1$, with inputs directly tied to connections 14', 14" carrying samples $K'_t$ and $K''_t$, while error signals $e_5$, $e_6$ are fed to a second calculator $CAL_2$ whose inputs receive samples $K'_{t-1}$ from these connections via a delay circuit $D_3$ which retards by one symbol period the data retrieved from filtering circuit EQC. In response to clock pulses CK, calculators $CAL_1$ and $CAL_2$ establish for each pair of these samples, associated with a given filtering coefficient $C_k^j$, two corrective terms $m_1$ and $m_2$ according to the following relationships:

$$m_1 = e_3 K'_t + e_4 K''_t \quad (6)$$

$$m_2 = e_5 K'_{t-1} + e_6 K''_{t-1} \quad (7)$$

An adder $SM_4$ algebraically combines signals $m_1$ and $m_2$ to generate a sum equal to gradient $\nabla_k^j$, this sum being fed to a multiplier $M_9$ for weighting by the fractional constant $\alpha$. The resulting product $\alpha \nabla_k^j$ is transmitted to a further adder $SM_5$ dialoguing with memory MC (FIG. 1) by way of connections 13, 15. Under the control of clock pulses CK, adder $SM_5$ algebraically augments a prior coefficient $C_k^{j-1}$ to form the updated coefficient $C_k^j$ according to equation (1).

The algorithm implemented by arithmetic unit CC is basically a process for determining multiplicative filtering coefficients $C_k^j$ which minimize the sum $(e_1^2 + e_2^2)$ of the squared decision errors $e_1$, $e_2$. In the presence of strong phase jitter, our improved equalizer incorporating this unit has been found to perform better than receivers operating with conventional coherent demodulation.

We claim:

1. An equalizer for a receiver of a data-transmission system operating with quadrature phase-shift keying, comprising:

noncoherent demodulation means connected to an incoming signal path for periodically producing digitized samples of in-phase and quadrature signal components during recurrent keying intervals;

digital filter means connected to said demodulation means for converting said digitized samples into filtered in-phase and quadrature samples with the aid of filtering coefficients stored in an associated memory;

delay means connected to said filter means for retarding the filtered in-phase and quadrature samples by one keying interval;

phase-comparison means with inputs connected across said delay means for producing in-phase and quadrature jump signals from phase differences between undelayed and delayed filtered samples;

decision means connected to said phase-comparison means for deriving quantized output signals from said in-phase and quadrature jump signals;

detection means connected across said decision means for generating in-phase and quadrature error signals from differences between said jump and output signals; and arithmetic means with inputs connected to said filter means, said delay means and said detection means and with access to said memory for updating the stored filtering coefficients during each keying interval on the basis of said error signals, said undelayed and delayed filtered samples and ancillary data temporarily stored in said filter means.

2. An equalizer as defined in claim 1 wherein said arithmetic means includes calculating stages for establishing individual updating signals for said filtering coefficients, each updating signal being proportional to the gradient of a squared decision error relating to the respective filtering coefficient.

3. An equalizer as defined in claim 2 wherein said calculating stages include an adder for summing two corrective terms, based on data retrieved in two consecutive keying intervals from said filter means, to produce each updating signal.

4. An equalizer as defined in claim 3 wherein said calculating stages further include multipliers, adders and subtractors for establishing cross-products between said delayed and undelayed filtered samples, on the one hand, and algebraic sums of said error signals, on the other hand, and further multiplying said cross-products with said ancillary data from a current and a preceding keying interval to yield said corrective terms.

* * * * *